April 9, 1963     R. P. GOTON     3,084,534
HIGH TEMPERATURE DIFFERENTIAL THERMAL ANALYZER
Filed Sept. 4, 1959     2 Sheets-Sheet 1

INVENTOR
ROLAND P. GOTON
BY
ATTORNEY

April 9, 1963 R. P. GOTON 3,084,534
HIGH TEMPERATURE DIFFERENTIAL THERMAL ANALYZER
Filed Sept. 4, 1959 2 Sheets-Sheet 2

INVENTOR
ROLAND P. GOTON
BY
ATTORNEY

United States Patent Office 3,084,534
Patented Apr. 9, 1963

3,084,534
HIGH TEMPERATURE DIFFERENTIAL
THERMAL ANALYZER
Roland P. Goton, Lakewood, Ohio, assignor to Union
Carbide Corporation, a corporation of New York
Filed Sept. 4, 1959, Ser. No. 838,235
10 Claims. (Cl. 73—15)

This invention relates to the determination of high temperature phase changes and it more particularly relates to an apparatus for measuring the temperature differential between two substances at high temperature.

The technique of determining when phase changes occur in a substance known in the art as differential thermal analysis has been used for many years to study both first order and second order phase changes. In addition to the study of phase change, this technique has similarly been used to study order-disorder reaction, radiation damage and geological formations.

Generally a differential thermal analyzer consists of a two compartment container having a known substance which is inert to the container in one compartment and an unknown substance in the other. A thermocouple is then suitably embedded in each sample whereupon the container and sample are heated under equal heat flux. By comparing the voltages derived from each thermocouple the difference in temperature between the two substances can be determined, and by averaging the voltages generated by each thermocouple the ambient temperature of the system may be determined. The value of an apparatus such as this is severely limited by the construction materials of both the container and the thermocouples. Prior high temperature differential thermal analyzers have been constructed of refractory materials which are insulators at low temperatures but which become electrical conductors at 1200° C. to 1400° C. This change in the conductance of the construction materials has been a problem that has not been solved in prior devices and has led, in some cases, to erroneous data being obtained.

It is therefore the principal object of this invention to provide a differential thermal analyzer which operates efficiently at temperatures higher than 2000° C.

In accord with and fulfilling this object, this invention comprises a differential thermal analyzer which comprises two identical containers suitably filled, respectively, with a substance of known thermal properties and with a substance whose thermal properties are to be determined; a connecting member between the two containers which is made of a material having different thermoelectric properties than those of the container material; and a single voltage measuring device connected in series to each container.

Understanding of this invention will be facilitated by reference to the accompanying drawing in which.

The term "boronated graphite" as used herein has reference to that graphitic material which has a very small amount of boron impurity doped therein. The amount of boron is just sufficient to change the thermoelectric properties of graphite to the extent that this material may be used in conjunction with unmodified graphite as the two dissimilar elements of a thermocouple. This material, boronated graphite, has recently been described in U.S. application Serial No. 677,743, R. D. Westbrook, filed August 12, 1957, now Patent No. 2,946,835. Its use is dictated by the temperature range to be studied in the analyzer since it is particularly well adapted to measure temperatures above 2000° C. to at least the 3000° C. range.

Figure 1:
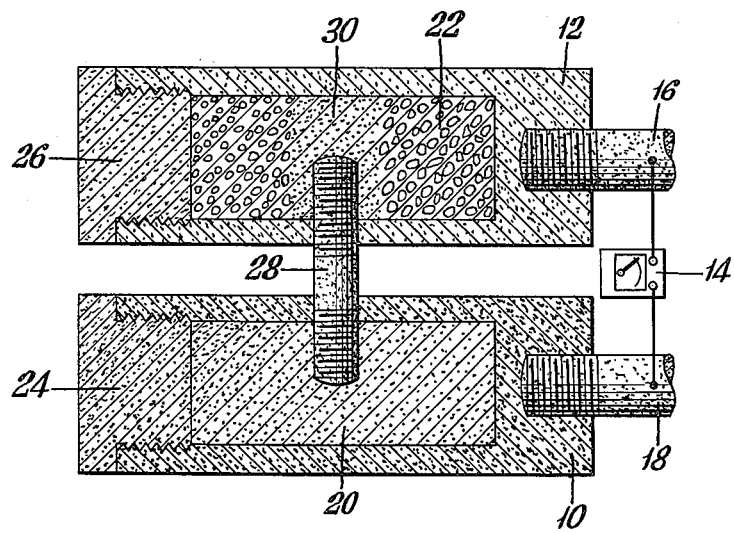
FIG. 1 is an elevation in section of an apparatus built in compliance with the precepts of this invention.

Referring to FIG. 1 of the accompanying drawing, an analyzer in accord with the subject invention comprises two containers 10 and 12 which are connected to a voltage measuring device 14 by independent leads 16 and 18. The first container 10 is filled with a substance 20 whose thermal properties are known, and the second container 12 is filled with a substance 22 whose thermal properties are to be determined. Each of the containers 10 and 12 are suitably sealed with plugs 24 and 26 in order to keep all the known and unknown substance within the containers from escaping should they possibly gassify or liquefy. The apparatus is completed by a member 28, whose thermoelectric properties are different from those of the container material, positioned between the two containers 10 and 12, so as to make contact with both the known sample 20 and the unknown sample 22.

It is preferred in the practice of this invention that the containers 10 and 12 be constructed of conductive material that will maintain its dimensional integrity throughout the temperature range to be studied. It is desirable, but not necessary, that the container material be the same as the known substance 20 and that the end of the member 28, which is in contact with the unknown substance 22, have a cap or covering 30 of this same material and that this material be in contact with the container.

Figure 2:
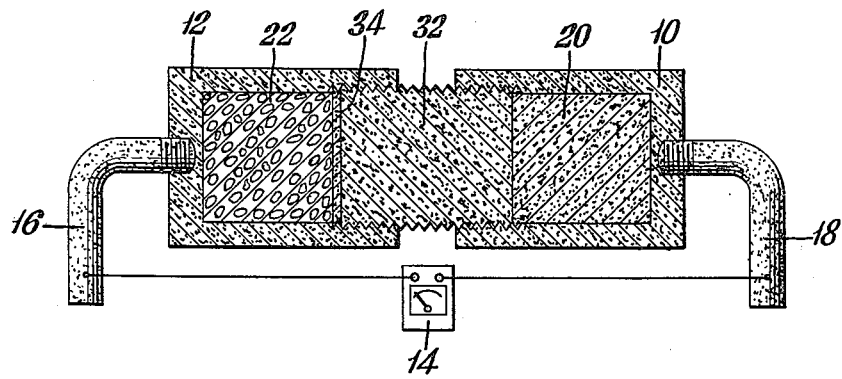
FIG. 2 is an elevation in section of a modified apparatus built according to this invention.

A modified apparatus according to this invention is shown in FIG. 2 of the accompanying drawing. In this modification, the containers 10 and 12 are suitably joined by a member 32 whose thermoelectric properties are different from those of the container material. This member 32 may be in the form of a nipple but regardless of its form the member 32 serves to cap both containers 10 and 12 and also forms an element in the electric circuit for the apparatus. This member suitably has a coating 34 thereon of the same material as that used as the known substance 20. The two containers 10 and 12 are connected to a voltage measuring device 14 suitably by leads 16 and 18.

Because of the high temperature region adapted to be studied by the apparatus described herein, it is important that the materials which make up this apparatus be able to withstand these temperatures. For this reason, graphite and boronated graphite have been chosen as the critical construction materials. It is immaterial which parts of the apparatus are made of graphite and which parts are made of boronated graphite provided that the two containers hereinabove referred to are identical even as to their construction material and that the member be of a material having different thermoelectric properties.

Figure 3:
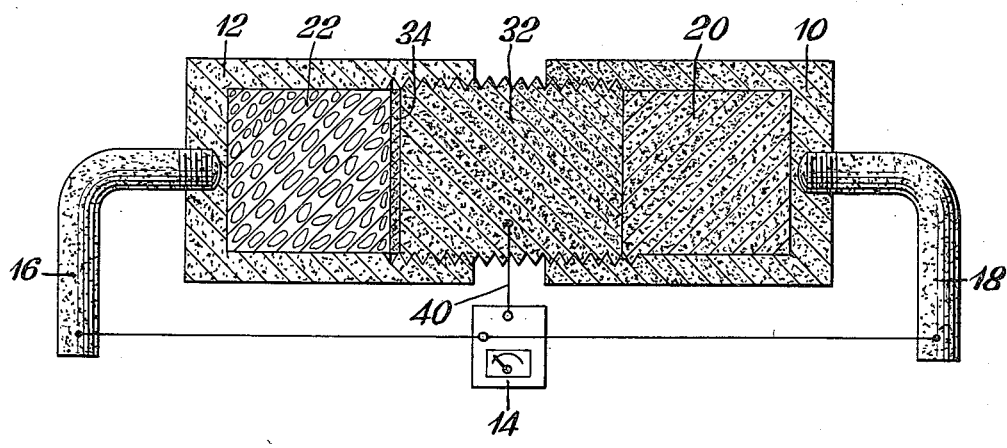
FIG. 3 is an elevation in section of a further modification of the apparatus built according to this invention.

It may be seen that this construction results in a system which effectively has two thermocouples, one in contact with the unknown substance and one in contact with the known substance, each of which comprises the juncture of the known substance and boronated graphite. It may also be seen that these thermocouples are opposite ends of the same member and are opposed to each other so that the resultant voltage produced is a function of the temperature differential between the known and the unknown substances. If desired, this apparatus may be very slightly modified so that the ambient temperature of the whole system can be determined from these same thermocouples. Referring to FIGURE 3, in order to do this, it is necessary that an additional lead 40 be connected to a point on the member 32 which is between the two containers 10 and 12. Both leads 16 and 18 extending from the containers 12 and 10, respectively, are connected to one terminal of a voltage measuring device 14 and the lead 40 from the member 42 is connected to the other terminal of the voltage measuring device 14. The voltage thus measured would then be a function of the average temperature of both substances.

In the operation of a differential thermal analyzer, such as that described herein, it is essential that an equal heat flux be supplied to both the known and the unknown substance so that each substance is at substantially the same temperature. This may be accomplished by electrical resistance heating directly through the containers themselves or it may be more easily done by placing the apparatus in some sort of furnace. It is not essential that any particular type of furnace be used although it has been found that a vertical tube furnace is desirable when operating at high temperatures because the containers tend to sag less at high temperatures when in the vertical position than they do when in the horizontal position.

It is desirable to use a known substance which undergoes no phase changes of either the first or second order type in the temperature range of interest. Such a substance would suitably be graphite in the range of 2500° C. to above 300° C. If such a substance is not available or if it is desired to use some other substance, the substance chosen may be one which has well-defined points of phase change so that a proper differential temperature may be determined.

The following may be cited as a specific example of the practice of this invention. An analyzer was made of 2 graphite cylinders, each 2 inches long by ⅝ inch outside diameter with a wall thickness of ⅛ inch, which had a ¼ inch diameter graphite rod extending from each cylinder into contact with a direct current amplifier which in turn was connected to a voltmeter recorder adapted to read directly in temperature. The first cylinder was filled with 5 grams of graphite powder, the second cylinder was filled with a powder consisting of 4.5 grams of a mixture consisting of 4 grams of molybdenum carbide and 0.5 grams of carbon and a plug was fitted into the open ends of each cylinder. A ⅛ inch diameter rod of boronated graphite containing 0.9 percent by weight boron was inserted through the sides of each container into contact with the powdered graphite at one end and the powdered mixture of molybdenum carbide and carbon at the other end. This latter end of the boronated graphite rod was capped with a layer of graphite powder which actually contacted the carbide-carbon mixture.

The two cylinders, spaced ¼ inch apart, were placed in a 2 inch tube furnace and heated to about 2700° C. in order to determine the temperature at which any phase changes would take place and the thermal magnitude of such phase changes. It was found that $\alpha'$ MoC formed at about 1165° C. and that this second order phase change resulted in a temperature differential of about 0.16° C. as shown by a voltage of 0.082 millivolts produced at this temperature by the system. Another second order phase change was observed at 1550° C. where $\alpha$ MoC was formed resulting in a temperature differential of 0.44° C. The molybdenum carbide-carbon eutectic was found to be formed at 2020° C. and the first order phase change of solid to liquid for all the substance present here occurred at 2630° C. accompanied by about a 1° C. temperature differential.

Other tests were conducted utilizing the high temperature differential thermal analyzer disclosed herein. Of particular importance were the tests conducted to determine the reactivity of uranium monocarbide, uranium dicarbide and nitrogen. These tests were run up to about 2500° C. The results of these tests showed that nitrogen reacts with uranium monocarbide between 500 and 900° C. and that this reaction is diffusion dependent. It was also noted that the nitride partially decomposes at 1860° C., that uranium monocarbide melts at 2420° C., and that uranium dicarbide melts at 2540° C.

These and other similar tests were run enough times to give reproducible results which were checked by analysis of quenched samples. This shows the utility of an analyzer of this construction in determining the thermal properties of substance at temperatures which are generally too high for those analyzers presently available.

What is claimed is:

1. An apparatus adapted to measure the high temperatudre phase changes of a first substance by measuring the instantaneous temperature differential between said substance and a second substance having known thermal properties which comprises a separate conductive container for each substance electrically insulated from each other wherein each container is made of one identical material selected from the group consisting of boronated graphite and graphite; leads extending respectively from said containers identical in composition to said containers; a voltage measuring device electrically connected across said leads at a point of equal temperature; and a conductive member of different thermoelectric properties than said containers in contact at each end respectively with each of said substances within said containers and with said containers, said member being made of one material selected from the group consisting of boronated graphite and graphite.

2. An apparatus as described in claim 1 wherein said containers are each graphite.

3. An apparatus as described in claim 1 wherein said containers are each boronated graphite.

4. An apparatus as described in claim 1 wherein said member is so constructed as to constitute a single contiguous wall between both containers and wherein said containers are otherwise electrically insulated from each other.

5. An apparatus as described in claim 1 wherein said containers are each graphite and said second substance is graphite.

6. An apparatus as described in claim 1 wherein a separate conductive connection passes from a point on said member intermediate said containers to said voltage measuring device.

7. An apparatus as described in claim 1 wherein both of said containers and said member are in combination with a single heat source thereby being subjected to equal heat flux so as to maintain substantially equal heat input to each of said two substances.

8. The method of determining high temperature phase changes in a first substance which comprises putting a quantity of said first substance in a closed first container made of a material selected from the group consisting of boronated graphite and graphite; placing a second substance, having known thermal properties in the temperature region of interest, in a closed second container identical to said first container; providing a member, of different thermoelectric properties than said container material, selected from the group consisting of boronated graphite and graphite between said containers in such relation thereto that one end of said member contacts said known substance and the other end of said member contacts said first substance; connecting a voltage measuring device between said containers; applying equal heat flux to both of said containers and said member; and measuring the voltage produced by said system, said voltage being a function of the instantaneous temperature differential between said known and said first substances and indicating any phase changes occurring in said first substance as a function of temperature.

9. The apparatus of claim 1 wherein a layer of a material identical to said second substance is disposed between said first substance and said conductive member.

10. The method of claim 8 wherein a layer of a material identical to said second substance is disposed between said first substance and said conductive member.

References Cited in the file of this patent

UNITED STATES PATENTS 2,797,575    Sand _____ July 2, 1957

OTHER REFERENCES

Journal of Scientific Instruments, volume 35, July 1958 (pp. 252–254). Article by Lloyd and Murray.